US012577086B2

(12) United States Patent
Fanning et al.

(10) Patent No.: US 12,577,086 B2
(45) Date of Patent: Mar. 17, 2026

(54) TRUCK MOUNTED FORKLIFT

(71) Applicant: Cargotec Engineering Ireland Limited, Dundalk Louth (IE)

(72) Inventors: Sean Fanning, Dundalk Louth (IE); Quentin Fougere, Dundalk Louth (IE); Thomas Lennon, Dundalk Louth (IE)

(73) Assignee: Cargotec Engineering Ireland Limited, Dundalk Louth (IE)

(*) Notice: Subject to any disclaimer, the term of this patent is extended or adjusted under 35 U.S.C. 154(b) by 482 days.

(21) Appl. No.: 18/053,468

(22) Filed: Nov. 8, 2022

(65) Prior Publication Data

US 2023/0144047 A1 May 11, 2023

(30) Foreign Application Priority Data

Nov. 8, 2021 (GB) ..................................... 2116037

(51) Int. Cl.
*B66F 9/075* (2006.01)
*B66F 9/20* (2006.01)

(52) U.S. Cl.
CPC ...... *B66F 9/07563* (2013.01); *B66F 9/07513* (2013.01); *B66F 9/20* (2013.01)

(58) Field of Classification Search
CPC .......... B66F 9/07513; B66F 9/20; B66F 9/22; B66F 9/07563; B66F 9/075; B66F 9/07568; B66F 9/0759; B66F 9/12; B66F 9/06
See application file for complete search history.

(56) References Cited

U.S. PATENT DOCUMENTS

| | | | | | |
|---|---|---|---|---|---|
| 4,587,875 | A * | 5/1986 | Deley | B23D 45/024 | 83/486.1 |
| 5,575,604 | A * | 11/1996 | Dubosh | B66F 9/07563 | 414/467 |
| 8,511,702 | B1 * | 8/2013 | Howell | B60D 1/245 | 280/455.1 |
| 2010/0204891 | A1 * | 8/2010 | Biggerstaff | E02F 9/2033 | 701/50 |
| 2016/0376134 | A1 * | 12/2016 | Xiaoxian | B62D 5/02 | 180/216 |
| 2017/0283227 | A1 * | 10/2017 | Turnbull | F15B 13/0402 | |
| 2021/0214200 | A1 * | 7/2021 | O'Keeffe | B66F 9/18 | |

FOREIGN PATENT DOCUMENTS

| | | | |
|---|---|---|---|
| JP | 07241116 | A * | 9/1995 |

* cited by examiner

*Primary Examiner* — Glenn F Myers
(74) *Attorney, Agent, or Firm* — Brian J. Colandreo; Jeffrey T. Placker; Holland & Knight LLP

(57) ABSTRACT

This invention relates to a truck mounted forklift comprising a U-shaped chassis having a pair of side bars bridged by a rear crossbar. There is provided a driver's station, a motive power unit and a lifting mechanism on the chassis. There is further provided a skid steer drive mechanism comprising two driven front wheels and a dolly rear wheel. The dolly rear wheel is rotatably mounted about a vertical axis offset from a central axis of the dolly rear wheel, and there is a releasable locking mechanism to secure the dolly rear wheel in a fixed orientation about the vertical axis. The releasable locking mechanism comprises a hydraulically operated locking pin on the chassis and a locking pin receiver on the dolly rear wheel. The locking pin is operated by way of a locking pin actuator on a driver's console, and there is a locking pin indicator on the console to warn the operator of the locking pin configuration.

19 Claims, 10 Drawing Sheets

TRUCK MOUNTED FORKLIFT

CROSS-REFERENCE TO RELATED APPLICATIONS

This application claims priority from United Kingdom patent application no. GB2116037.9 filed on Nov. 8, 2021, the entirety of which is hereby fully incorporated by reference herein.

TECHNICAL FIELD OF THE INVENTION

This invention relates to a truck mounted forklift. More specifically, the present invention relates to a truck mounted forklift having a skid steer system.

BACKGROUND TO THE INVENTION

Truck mounted forklifts, also commonly referred to as piggyback forklifts, are a particular type of forklift truck that may be transported to and from customer's premises on the rear of a carrying vehicle such as an artic chassis. Once at the customer's premises, the truck mounted forklift may be dismounted from the artic chassis and used to handle goods at the customer's premises, including placing or removing goods to or from the bed of the artic chassis.

As such, there are a number of considerations and design constraints that apply to truck mounted forklifts that are particular to truck mounted forklifts. For example, it is essential that the weight of the truck mounted forklift is kept to an absolute minimum. Any increase in the weight of the truck mounted forklift will result in a decrease in the available load carrying capacity of the carrying vehicle which is highly undesirable. Accordingly, truck mounted forklifts tend to have a U-shaped chassis that allows the operator to pick up and put down loads rearward of the front wheels of the truck mounted forklift. By having such a configuration, this increases the carrying capacity of the truck mounted forklift without the need for counterweights and increasing the weight of the truck mounted forklift. Secondly, in many jurisdictions, there are limitations on the distance that a truck mounted forklift may protrude behind the carrying vehicle when in transit and therefor the fore-aft dimension of the truck mounted forklift is important. It is necessary to provide as compact a configuration as possible. Thirdly, truck mounted forklifts are often required to manoeuvre in confined spaces such as customer warehouses and it is desirable to have a highly manoeuvrable truck mounted forklift that can operate in confined spaces.

One particular drive system that provides good maneuverability is the so-called skid steer system. A skid steer system comprises a pair of driven front wheels and a non-driven dolly rear wheel, also called a castor wheel. The skid steer system is advantageous as it is highly manoeuvrable, allowing the truck mounted forklift to effectively turn about a fixed vertical axis if required to do so. This turning is achieved by reversing the drive direction of one of the front wheels. The dolly rear wheel will effectively allow the movement of the rear of the truck mounted forklift to be dictated to by the driven front wheels. A second advantage of the skid steer system is that it obviates the need for a motor for the dolly rear wheel, thereby reducing the weight of the truck mounted forklift, and increasing the available load carrying capacity of the carrying vehicle. Accordingly, there is demand for such truck mounted forklifts in the marketplace.

There are however problems with the known skid steer systems. First of all, due in part to the fact that the weight of the truck mounted forklift is concentrated towards the rear of the vehicle, by having a non-driven rear wheel, when attempting to drive for a prolonged distance in a straight line, the forklift has a tendency to "crab" from side to side and it can be difficult to keep the forklift moving in a straight line. Secondly, if driving up an incline such as a ramp or a hill at an angle, there is a tendency for the heavy rear of the truck mounted forklift to slip down the hill. This can hamper maneuverability of the truck mounted forklift, can lead to a destabilization of the carried load and is a potential cause of accidents. Accordingly, it is desirable to have a mechanism to lock the dolly rear wheel in a fixed configuration when travelling up or down an incline, or when it is desirable to drive in a straight line fora prolonged period of time. In addition, if the rear dolly wheel is allowed to rotate during transit on a carrying vehicle, this can cause damage to the rear dolly wheel and its mounting. Accordingly, it is beneficial to lock the rear dolly wheel in position when the truck mounted forklift is mounted on a carrying vehicle.

Locking mechanisms for dolly rear wheels on truck mounted forklifts are known in the art. Typically, these locking mechanisms comprise a cable-actuated brake or a manually-actuated locking rod located rearward of the driver's seat above the dolly rear wheel. These locking mechanisms are intended to temporarily prevent rotation of the dolly wheel while the truck mounted forklift is being driven in a straight line for a prolonged period of time or when driving up or down an incline at an angle. However, heretofore, the known solutions have not proven to be entirely satisfactory.

First of all, the known mechanisms are unwieldy and difficult to operate. Secondly, it is practically impossible for the operator to tell whether or not the brake or locking rod is properly engaged. This can lead to unexpected movement during transit. Thirdly, due to the lack of driver feedback and the positioning of the braking mechanisms rearward of the driver, it is not uncommon for the driver to forget to release the braking mechanism once it is no longer required. If the braking mechanism is left on during normal operation, this can cause significant damage to the truck mounted forklift including damage to the bearings and the tyres on the dolly rear wheel. Fourth, the locking mechanisms must be positively engaged by the operator. If the operator forgets to engage the locking mechanism before the truck mounted forklift is transported on the rear of a carrying vehicle to the next destination, the dolly rear wheel will be free to rotate and this can cause damage to the forklift.

Accordingly, it is an object of the present invention to provide a truck mounted forklift that overcomes at least one or more of these problems. It is a further object of the invention to provide a useful alternative choice to the consumer.

SUMMARY OF THE INVENTION

According to the invention there is provided a truck mounted forklift comprising a U-shaped chassis having a pair of forwardly projecting side bars bridged by a rear crossbar, a driver's station mounted on the chassis, a motive power unit mounted on the chassis, and a lifting mechanism mounted on the chassis for engagement of a load between the side bars, and in which there is provided a skid steer drive mechanism comprising a pair of driven front wheels, one driven front wheel mounted adjacent the forwardmost end of one of the side bars and the other driven front wheel mounted adjacent the forwardmost end of the other of the side bars, and a dolly rear wheel mounted on the rear crossbar, the dolly rear wheel being rotatably mounted about a vertical axis offset from a central axis of the dolly rear wheel, and in which there is provided a releasable locking mechanism to releasably secure the dolly rear wheel in a fixed orientation about the vertical axis, the releasable locking mechanism comprising a hydraulically operated locking pin mounted on the chassis and a complementary locking pin receiver mounted on the dolly rear wheel.

By having such a truck mounted forklift, the releasable locking mechanism will be less unwieldy and easier to operate. In addition, it will be easier for the operator to tell when the locking mechanism has been properly engaged, as a hydraulically operated locking pin mounted on the chassis will allow for the placement of reliable sensors to detect correct operation of the locking pin. Furthermore, it is no longer necessary to place the actuator for the braking mechanism rearward of the driver, so it will be less likely for the driver to forget to release the braking mechanism once it is no longer required.

In one embodiment of the invention there is provided a truck mounted forklift in which there is provided a sensor on the hydraulically operated locking pin operable to detect when the locking pin is fully engaged in the locking pin receiver, and a locking pin indicator responsive to the sensor, the locking pin indicator being located in the driver's station operable to display whether the locking pin is in either a locked configuration engaging the locking pin receiver or a released configuration free of the locking pin receiver.

Again, in this way, it will be easier for the operator to tell when the locking mechanism has been properly engaged, as there will be a locking pin indicator located in the driver's station indicating the status of the locking pin. In addition, it will be less likely for the driver to forget to release the braking mechanism once it is no longer required.

In one embodiment of the invention there is provided a truck mounted forklift in which there is provided a driver console in the driver's station, forward of a driver's seat, and in which there is provided a locking pin actuator switch on the driver console. In this way, the driver will not have to reach behind themselves to operate a cable or locking rod system. Instead, there will be a simple actuator switch on the driver's console. This will simplify the operation of the locking mechanism.

In one embodiment of the invention there is provided a truck mounted forklift in which the locking pin indicator is located on the driver console in the driver's station adjacent to the locking pin actuator switch. This is seen as a particularly beneficial layout for the operator. The operator will be provided with the means to adjust the locking pin adjacent to the indicator that will inform the operator what configuration the locking pin is in. This provides a clear signal to the operator whether the locking pin is in place and whether action is required on their part.

In one embodiment of the invention there is provided a truck mounted forklift in which there is provided a locking pin actuator switch located outside the driver's station accessible when the truck mounted forklift is mounted on the rear of a carrying vehicle. In this way, if the locking pin is engaged in the locking pin receiver with the rear wheel located in the incorrect position, the locking pin can be temporarily released to allow the wheel to be realigned without the driver having to climb up into the vehicle. Indeed, as will be understood in the art, when the truck mounted forklift is mounted on the rear of a carrying vehicle, it will be tilted forwards, thereby promoting the wheel to rotate around the offset vertical axis towards a stowed compact configuration where it can be locked in position.

In one embodiment of the invention there is provided a truck mounted forklift in which the locking pin is spring loaded biased towards a locked configuration. This is seen as a particularly useful configuration of the invention. By having the locking pin spring loaded towards a locked configuration, once the engine is turned off, the locking pin will be urged towards a locking configuration. Therefore, the dolly rear wheel will be safely locked in position during transit.

In one embodiment of the invention there is provided a truck mounted forklift in which the hydraulically operated locking pin is provided with a charge feed to unlock the locking pin. In one embodiment of the invention there is provided a truck mounted forklift in which the charge feed is fed from the transmission pump of the forklift. By using the charge pressure from the transmission pump, this will ensure the automatic deactivation of the locking mechanism as soon as the engine is started. Otherwise, the cylinder would need to be manually operated by the driver with the use of a lever on the valve bank of the machine, thereby removing the benefit of having an automated unlocking configuration.

In one embodiment of the invention there is provided a truck mounted forklift in which the locking pin is chamfered to facilitate insertion of the end of the locking pin into the complementary locking pin receiver.

In one embodiment of the invention there is provided a truck mounted forklift in which the locking pin receiver comprises a locking plate held in a fixed relationship relative to the dolly rear wheel, the locking plate having a pair of locking pin receiving apertures. This is seen as a simple yet robust configuration to provide that will not be prone to failure.

In one embodiment of the invention there is provided a truck mounted forklift in which the pair of locking pin receiving apertures are located diametrically opposed to each other on the locking plate. By having a pair of locking pin receiving apertures located diametrically opposite to each other, the wheel may be locked in one of two positions with the wheel offset by 180° from the other configuration.

In one embodiment of the invention there is provided a truck mounted forklift in which the locking pin receiving apertures are located on the locking plate to cause the dolly wheel to be aligned parallel to a longitudinal axis of the forklift when the locking pin is engaged in either of the locking pin receiving apertures.

In one embodiment of the invention there is provided a truck mounted forklift in which the central axis of the dolly rear wheel is forward of the vertical axis when the locking pin is engaged in the first locking pin receiving aperture, and the central axis of the dolly rear wheel is rearward of the vertical axis when the locking pin is engaged in the second locking pin receiving aperture. In this way, as the vertical axis is offset to the central axis of the wheel, the wheel may be locked in a configuration with the wheel protruding rearwardly from the vertical axis and from the vehicle (which will be good for stability during operation) or locked in a configuration with the wheel stowed underneath the vehicle (which will be good for transit and reducing overhang).

In one embodiment of the invention there is provided a truck mounted forklift in which when the locking pin is engaged in the first locking pin receiving aperture, the dolly rear wheel is stowed under the forklift forward of the aft-most point of the forklift. This is seen as beneficial as the overhang of the truck mounted forklift will be minimized while it is being transported on the rear of a carrying vehicle.

In one embodiment of the invention there is provided a truck mounted forklift in which the locking plate is configured to promote location of the locking pin in the nearest locking pin receiving aperture when the locking pin is operated and abutting the locking plate. This is seen as useful as the locking pin will be urged towards the nearest locking pin receiving aperture when the locking pin is not perfectly aligned with the locking pin receiving aperture. This will promote a secure engagement each time.

In one embodiment of the invention there is provided a truck mounted forklift in which the upper surface of the locking plate surrounding the locking pin receiving aperture is inclined downwardly towards the locking pin receiving aperture.

In one embodiment of the invention there is provided a truck mounted forklift in which the locking pin tapers towards a tip, and there is provided a channel recessed in the upper surface of the locking plate for receiving the tip of the locking pin, the channel configured so that it widens as it approaches the locking pin receiving aperture.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1:
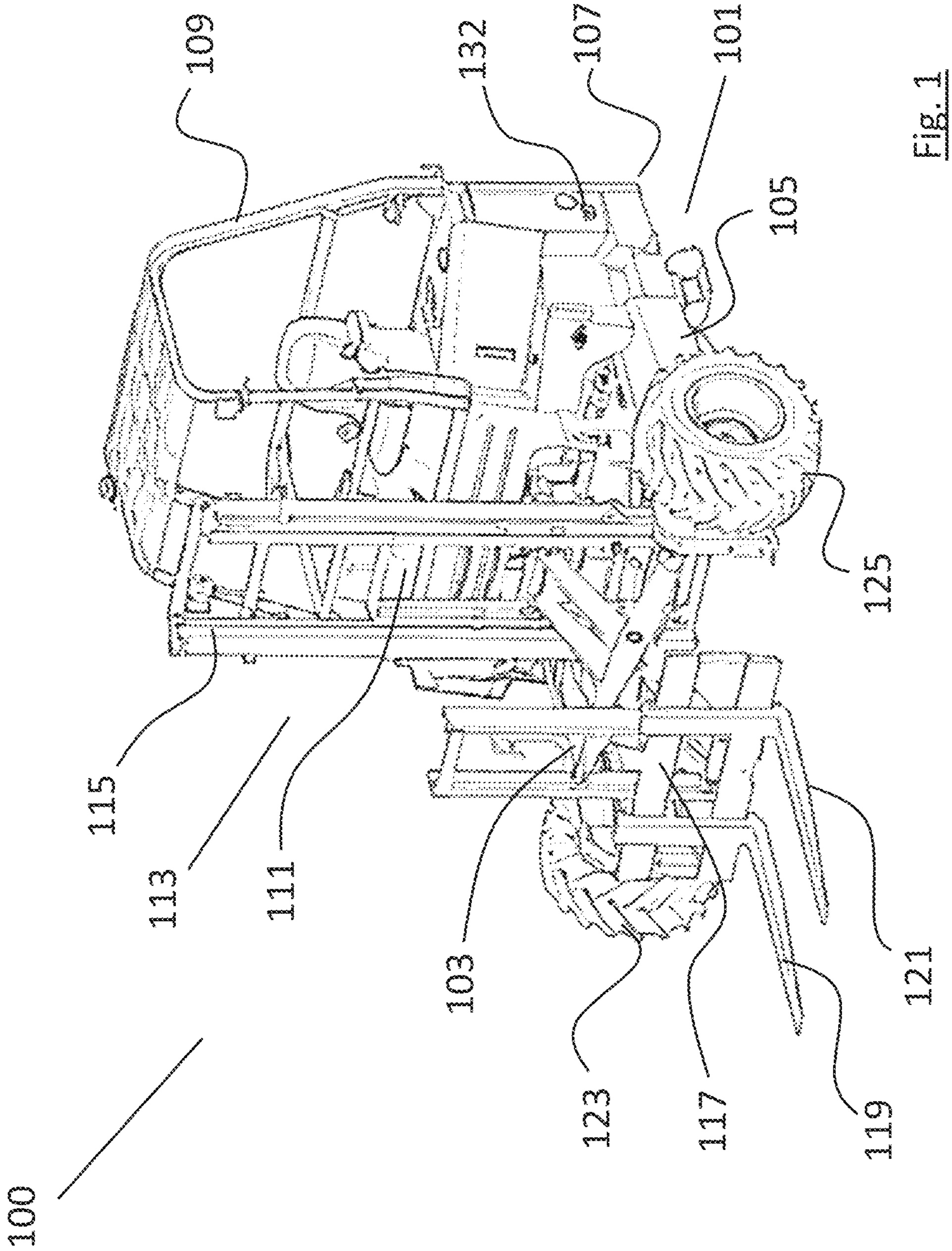
FIG. 1 is a perspective view of a truck mounted forklift according to the invention.

Referring initially to FIGS. 1 to 4 inclusive, there is shown a truck mounted forklift, indicated generally by the reference numeral 100, comprising a U-shaped chassis 101 having a pair of forwardly projecting side bars 103, 105 bridged by a rear crossbar 107. The truck mounted forklift further comprises a driver's station 109 mounted on the chassis, a motive power unit 111 mounted on the chassis, and a lifting mechanism 113 mounted on the chassis for engagement of a load (not shown) between the side bars. In the embodiment shown, the lifting mechanism 113 is an upright mast 115 having a fork carriage 117 carrying tines 119, 121. The fork carriage 117 is moveable up and down the upright mast 115 in a reciprocal fashion. The reach of the tines 119, 121 may be adjusted using a pantograph linkage so that goods may be picked up and/or transported rearward of the front wheels 123, 125, and picked up and/or put down forward of the front wheels 123, 125.

Figure 2:
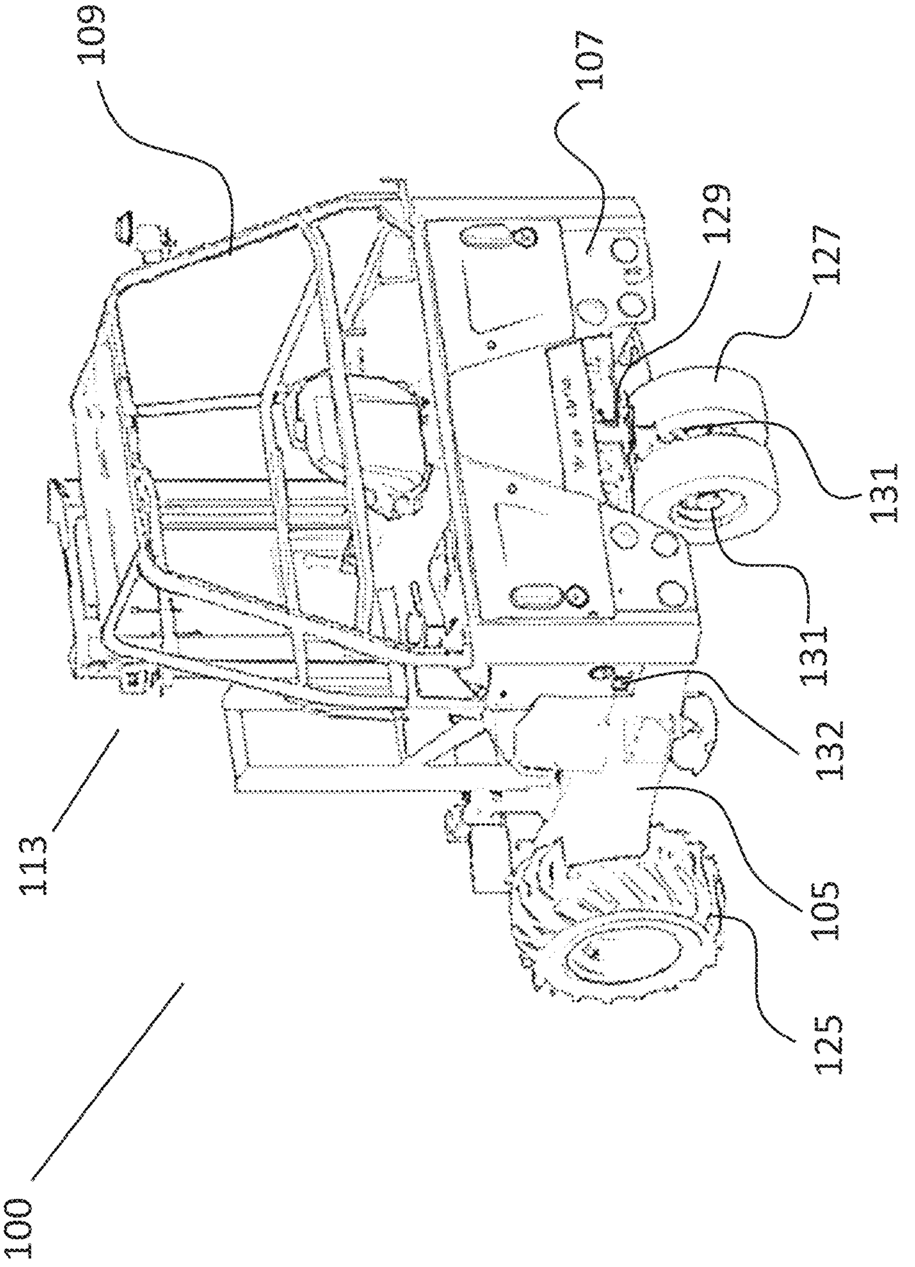
FIG. 2 is a rear perspective view of the truck mounted forklift of FIG. 1.

The truck mounted forklift incorporates a skid steer drive mechanism comprising a pair of driven front wheels 123, 125, one driven front wheel 123 mounted adjacent the forwardmost end of one of the side bars 103 and the other driven front wheel 125 mounted adjacent the forwardmost end of the other of the side bars 105. Referring specifically to FIG. 2, the skid steer drive mechanism further comprises a dolly rear wheel 127 mounted on the rear crossbar. The dolly rear wheel 127 is rotatably mounted about a vertical axis 129 offset from a central axis 131 of the dolly rear wheel 127.

As will be described in more detail below, the skid steep mechanism comprises a releasable locking mechanism to releasably secure the dolly rear wheel 127 in a fixed orientation about the vertical axis 129.

Figure 3:
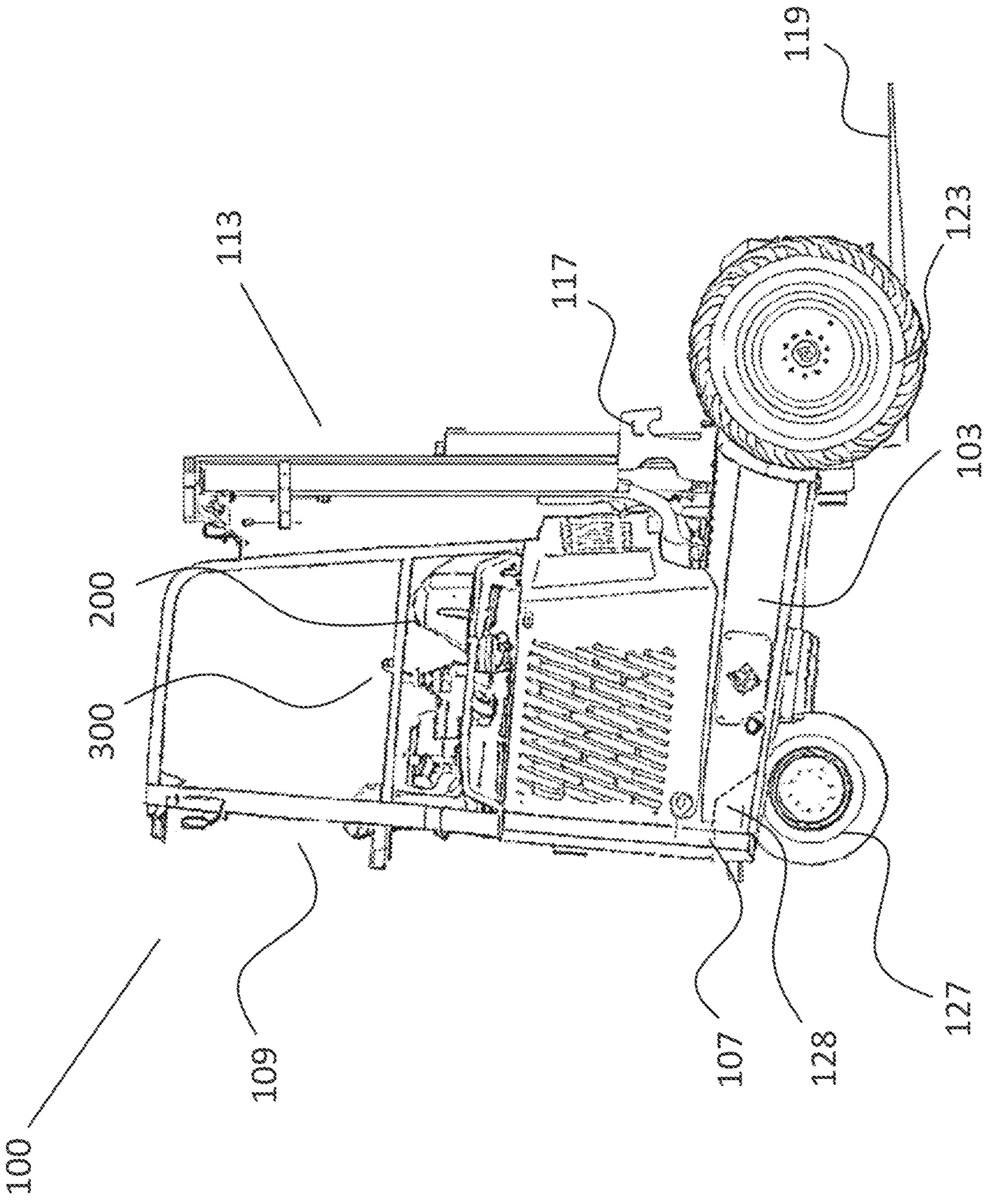
FIG. 3 is a side view of the truck mounted forklift of FIG. 1.

Referring specifically to FIG. 3, the dolly rear wheel 127 is shown in a locked, stowed configuration in which the dolly rear wheel 127 is secured underneath the chassis 101, substantially forward of the rear crossbar 107. It can be seen that in this configuration, the truck mounted forklift 100 is tilted forwards with the dolly rear wheel raised relative to the driven front wheels 123, 125. This is how the truck mounted forklift is configured when mounted on a carrying vehicle (not shown). This is achieved by tilting the upright mast backwards using a tilt cylinder (not shown) when the tines 119, 121 are engaged in fork sockets (not shown) on the carrying vehicle. It will be understood that when the forklift is in this tilted configuration, if unlocked, the dolly rear wheel 127 will have a tendency to rotate about the offset vertical axis (part of the wheel mounting 128 that rotates about the vertical axis is shown in ghost outline angled forwards) to a position where the dolly rear wheel is facing forwards aligned with the longitudinal axis of the truck mounted forklift. In addition to the foregoing, there is shown an operator control console 200 having a control panel thereon (that will be described in more detail with respect to FIG. 8 below), and an operator joystick 300 for steering the truck mounted forklift.

Figure 4:
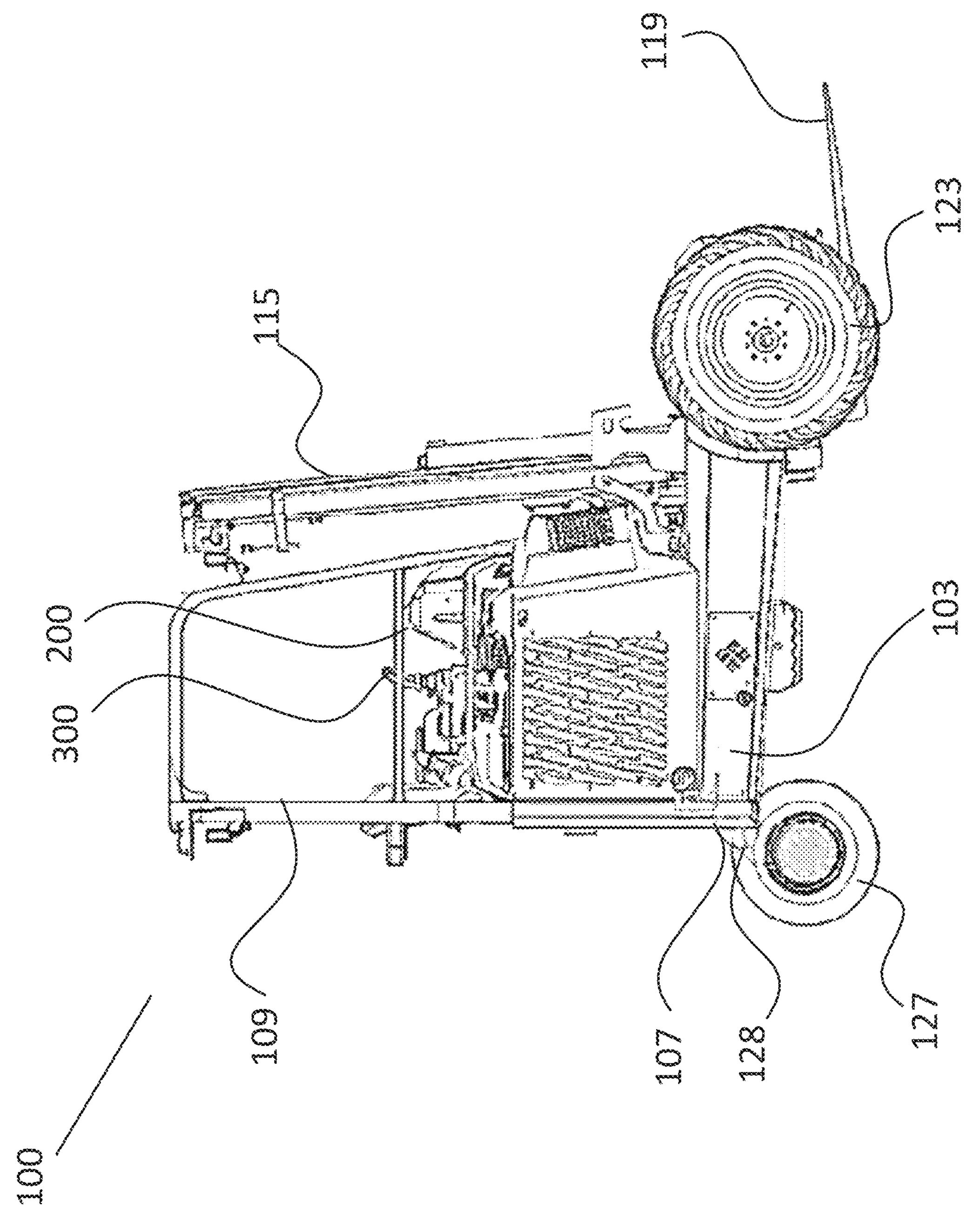
FIG. 4 is a side view of the truck mounted forklift with the dolly rear wheel locked in an operating configuration.

Referring specifically to FIG. 4, there is shown a view of the forklift with the dolly rear wheel 127 in an alternative locked configuration protruding rearwardly from the truck mounted forklift (the part of the wheel mounting 128 is shown in ghost outline angled rearwards). In this configuration, the truck mounted forklift 100 can be driven in a straight line for a prolonged period of time and can be driven up or down a slope, even at an angle offset to the direction of the slope. It can be seen that the upright mast 115 is still tilted rearwards so that the tines 119, 121 are inclined upwards away from the truck mounted forklift. This is a common configuration for the lifting arrangement when transporting a load on the tines 119, 121.

Figure 5:
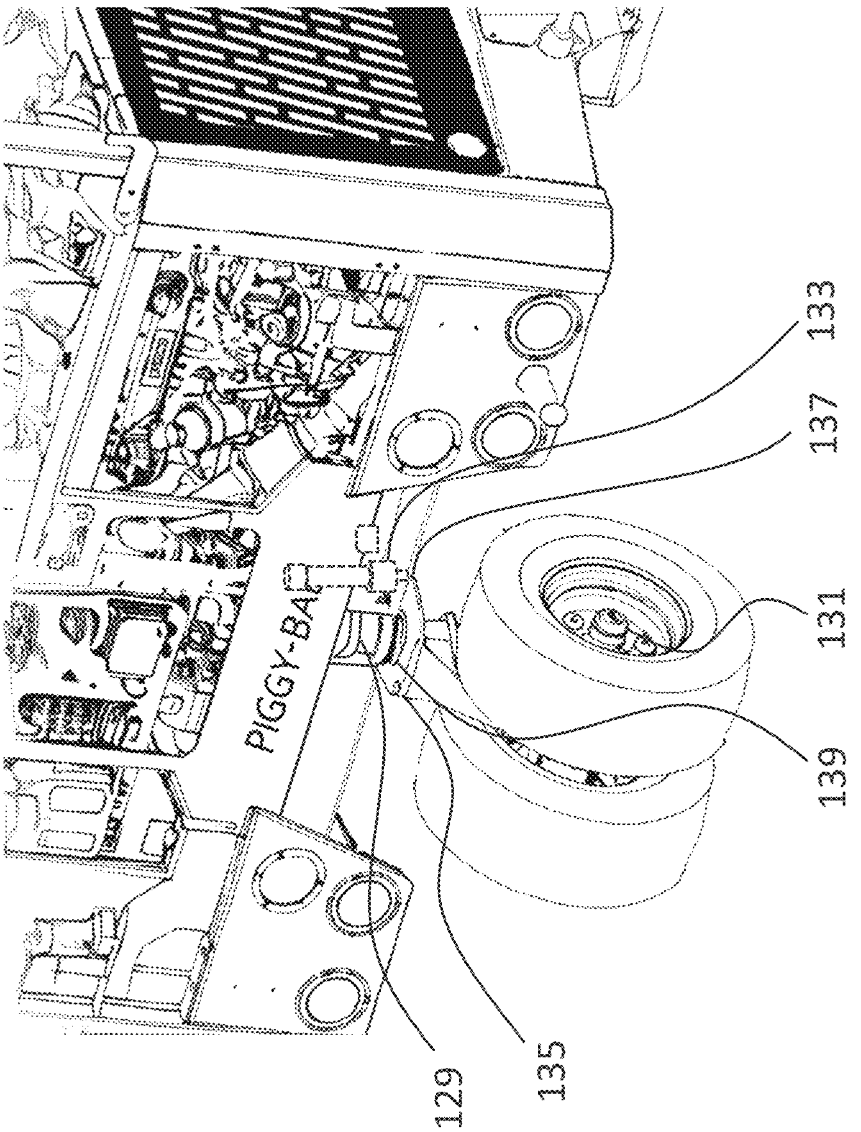
FIG. 5 is an enlarged view of the dolly rear wheel and a disengaged locking mechanism shown in ghost outline.

Referring now to FIG. 5, there is shown a view of the dolly rear wheel with the releasable locking mechanism shown in ghost outline. The releasable locking mechanism comprises a hydraulically operated locking pin 133 mounted on the chassis, and a pair of complementary locking pin receivers 135, 137 which are formed in a locking plate 139 attached to and forming part of the dolly rear wheel 127. It will be understood that when the locking pin 133 is engaged in the locking pin receiver 137, the dolly rear wheel protrudes outwardly from the rear of the truck mounted forklift. If the dolly rear wheel 127 is rotated through 180° about the vertical axis 129, and the locking pin 133 is engaged in the other locking pin receiver 135, the dolly rear wheel 127 will be stowed underneath the truck mounted forklift.

Figure 6B:
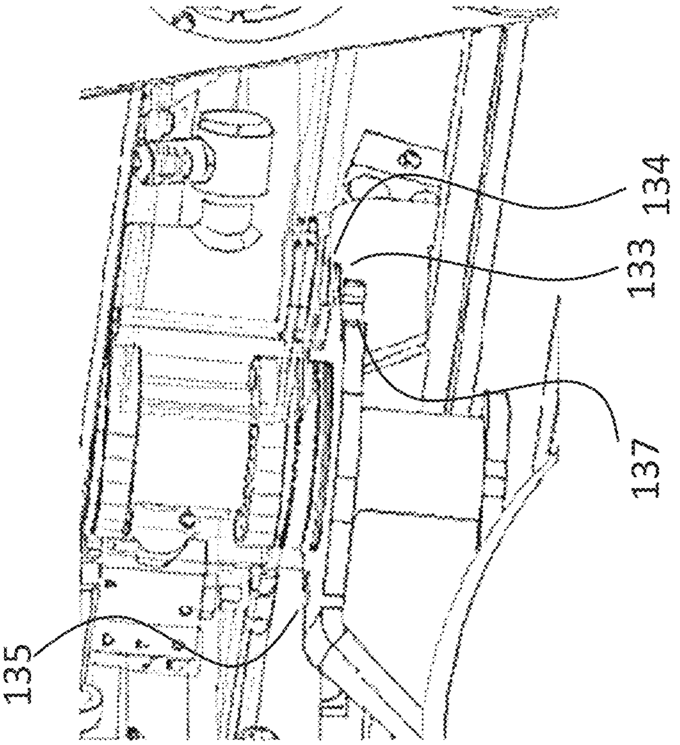
FIGS. 6(*a*) and 6(*b*) are views of the hydraulically operated locking pin free of the locking pin receiving aperture.
Figure 6A:
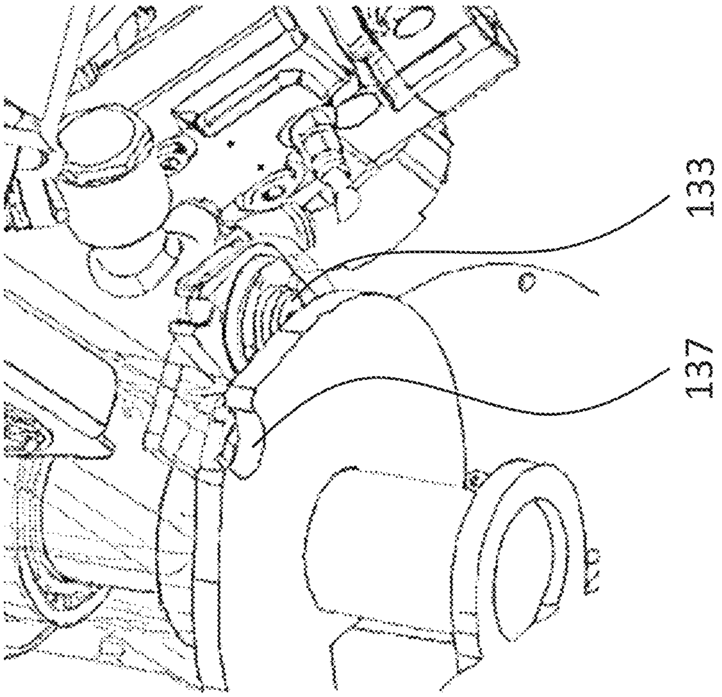
Figure 7A:
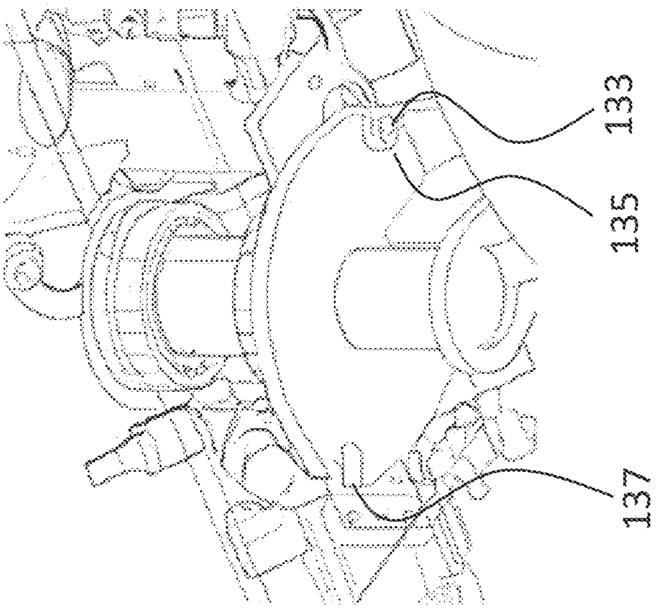
FIGS. 7(*a*) and 7(*b*) are views of the hydraulically operated locking pin engaged in the locking pin receiving aperture.
Figure 7B:
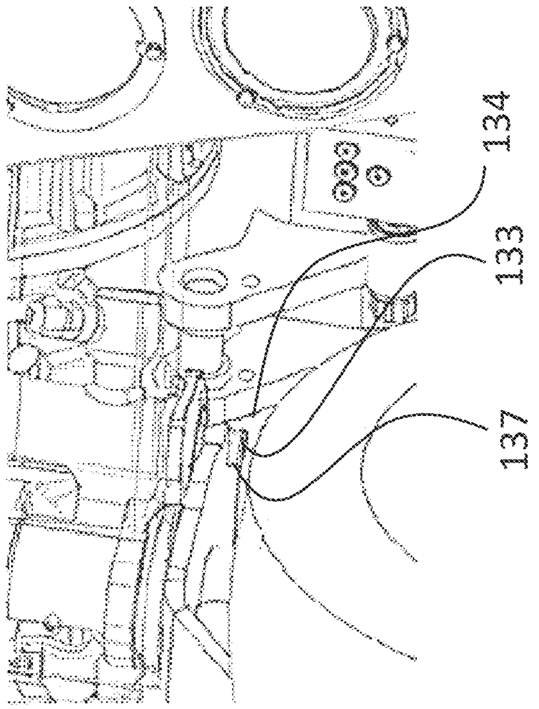

Referring now to FIGS. 6(*a*) and 6(*b*), there are shown views of the locking pin 133 free of the locking pin receivers 135, 137. As will be described in more detail below, if the locking pin is actuated or if the fluid supply is removed from the hydraulic actuating cylinder, the locking pin 133 will be urged downwards onto the locking plate 139. When the locking pin aligns with one of the locking pin receivers 135, 137 on the locking plate 139, the locking pin will be urged downwards into the locking pin receiver 135, 137, as illustrated in FIGS. 7(*a*) and 7(*b*) respectively.

As can be seen in FIGS. 6(*a*), 6(*b*), 7(*a*) and 7(*b*), the locking pin 133 is chamfered to facilitate insertion of the end 134 of the locking pin into the complementary locking pin receiver 135, 137. The locking plate 139 may be configured to promote location of the locking pin 133 in the nearest locking pin receiver 135, 137 when the locking pin is operated and abutting the locking plate 139. For example, it is envisaged that the upper surface of the locking plate 139 surrounding the locking pin receiver 135, 137 may be inclined downwardly towards the locking pin receiver 135, 137. Similarly, it is envisaged that the locking pin 133 may taper towards a tip, and there may additionally be provided a channel recessed in the upper surface of the locking plate 139 for receiving the tip of the locking pin 133, the channel configured so that it widens as it approaches the locking pin receiver 135, 137. As the locking pin 133 is urged towards the locking plate, the downward force will act to progress the pin downwardly causing the pin to be inserted further into the channel and the locking plate to rotate 139 until the pin is located into one of the locking pin receivers 135, 137.

Figure 8:
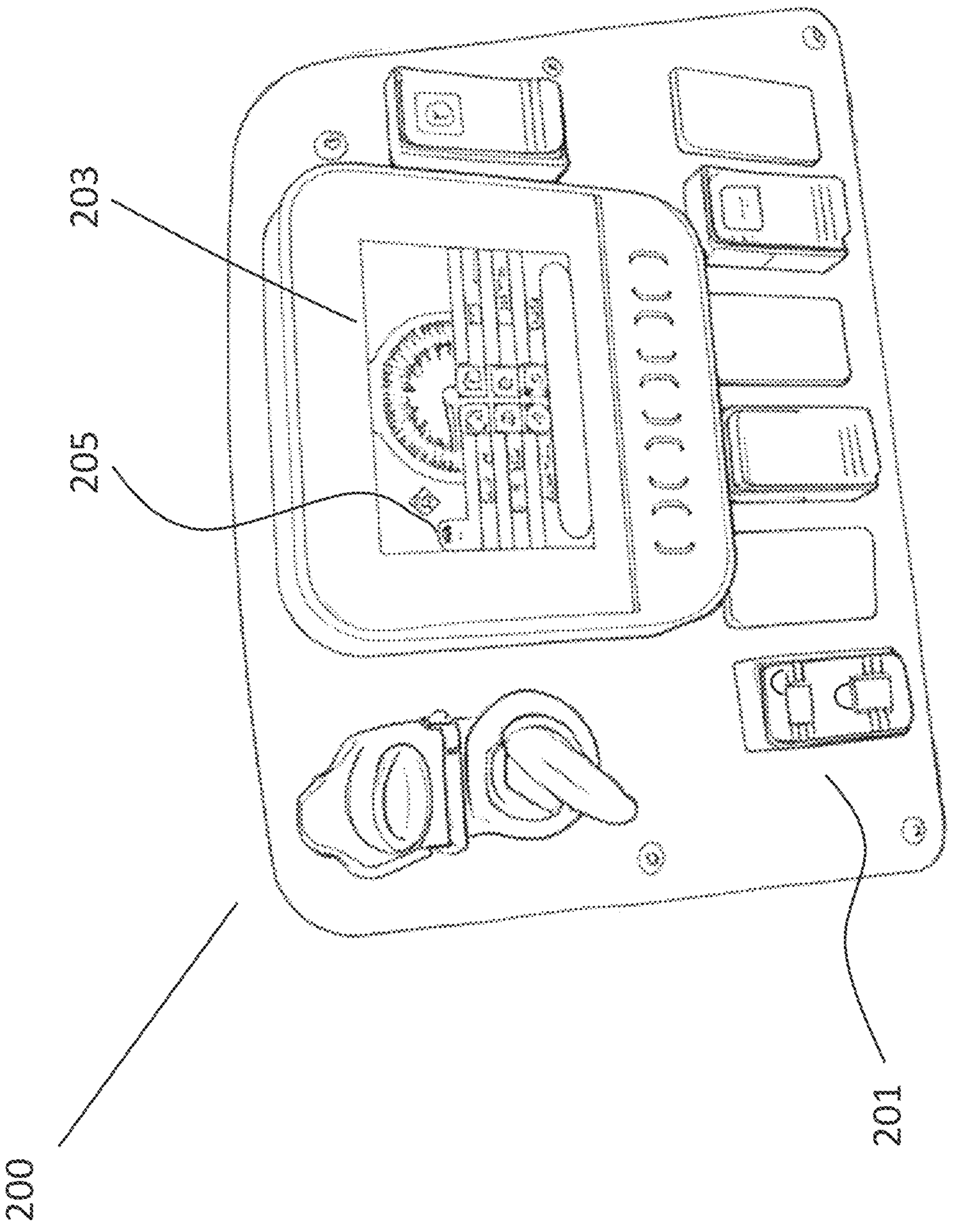
FIG. 8 is a view of the driver's console in the driver's station.

Referring to FIG. 8, there is shown an operator control console 200. The operator control console includes a locking pin actuator switch 201 that allows the operator to selectively lock and unlock the locking mechanism. In addition, there is provided a human machine interface (HMI) 203 which incorporates a locking pin indicator 205 which illustrates to the operator whether or not the locking pin is in a locked, engaged configuration. In this way, the operator will be able to determine at a glance whether or not the locking pin is engaged, and the operator will be able to lock or unlock the locking pin with the mere press of a button on the operator console. The locking pin indicator 205 will be responsive to a sensor (not shown) adjacent to the locking pin that will be able to sense the position of the locking pin and determine whether it is retracted or fully extended out of a locking cylinder (not shown). If the locking pin is fully extended out of the locking cylinder it will be known that the locking pin is fully engaged.

Figures 9A, 9B, 9C, 9D, 9E, 9F, 9G:
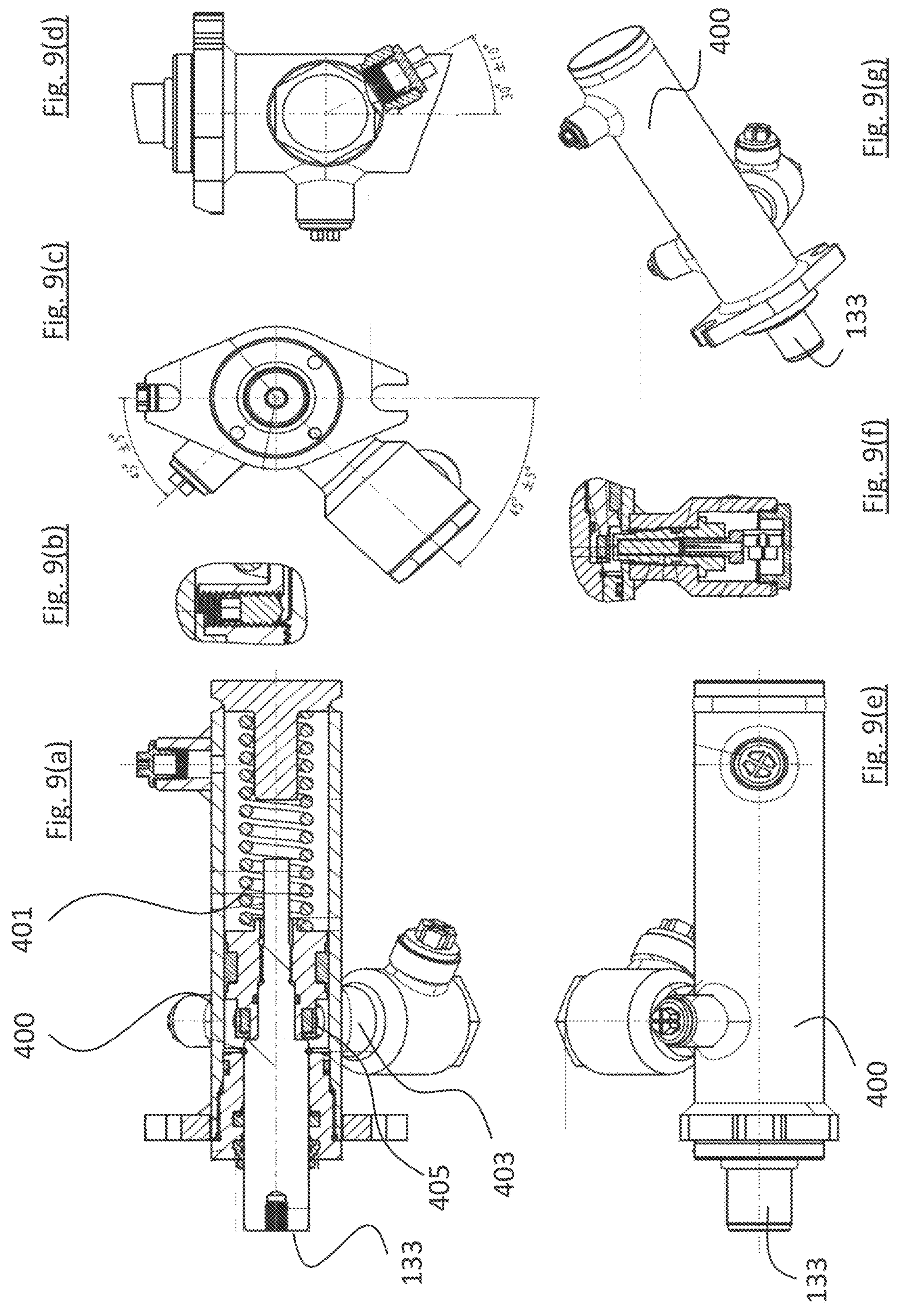
FIGS. 9(*a*) to 9(*g*) inclusive are views of the hydraulically operated locking pin.

Referring now to FIGS. 9(*a*) to 9(*g*) inclusive, there is shown a locking cylinder, indicated generally by the reference numeral 400, having a locking pin 133 configured in the manner of a piston in the locking cylinder 400 and mounted for reciprocal movement in and out of the locking cylinder 400. A helical spring 401 is provided to urge the locking pin 133 out of the locking cylinder 400 towards a locking pin receiver (not shown). When the truck mounted forklift 100 is started up, hydraulic fluid flows into the transmission circuit (not shown) and a charge flow is provided to the locking cylinder 400 to retract the locking pin 133 into the locking cylinder 400 against the helical spring 401 force. This unlocks the locking mechanism and allows the dolly rear wheel 127 to rotate about the vertical axis 129 for normal truck mounted forklift operation. A magnetic sensor 403 detects a target 405 on the locking pin 133 to determine whether the locking pin is fully extended.

When it is desired to allow the locking pin 133 to move out of the cylinder and lock the dolly rear wheel in place, the dolly rear wheel 127 is aligned by the operator of the forklift in the desired direction, the hydraulic fluid pressure is removed by the operator pushing the locking pin actuator switch 201, and the helical spring 401 acts to push the locking pin 133 out of the locking cylinder 400 into a locking configuration. Similarly, it will be understood that if the engine is turned off, the hydraulic fluid supply is removed, the locking pin 133 will be pushed out of the locking cylinder 400 into a locking configuration under the helical spring 401 force.

Reference is made to the dolly rear wheel 127 being aligned by the operator of the forklift in the desired direction. It will be understood that in order to align the dolly rear wheel 127 in an operative configuration as shown in FIG. 4, the operator simply has to drive the truck mounted forklift forward for a short distance. After a short distance, the dolly rear wheel 127 will follow the direction of movement of the truck mounted forklift and will be ready for locking by the locking pin 133 being inserted into the locking pin receiver 137. Similarly, in order to align the dolly rear wheel 127 in a stowed configuration as shown in FIG. 3, the operator simply has to reverse the truck mounted forklift backwards for a short distance. Due to the fact that the dolly rear wheel central axis 131 is mounted about an offset vertical axis 129, the dolly rear wheel 127 will move to a configuration with the dolly rear wheel behind the vertical axis 129 in line with the direction of travel of the truck mounted forklift. Alternatively, it is envisaged that it is possible to align the dolly wheel 127 in a stowed configuration during the truck mounting procedure. When the forklift truck is raised off the ground with no weight on the rear dolly wheel, and with the forklift truck tilted forwards, the rear dolly wheel will have a tendency to rotate about the vertical axis under gravity into the stowed configuration. Once in the desired position, the locking pin 133 is engaged in the locking pin receiver 135.

Figure 10:
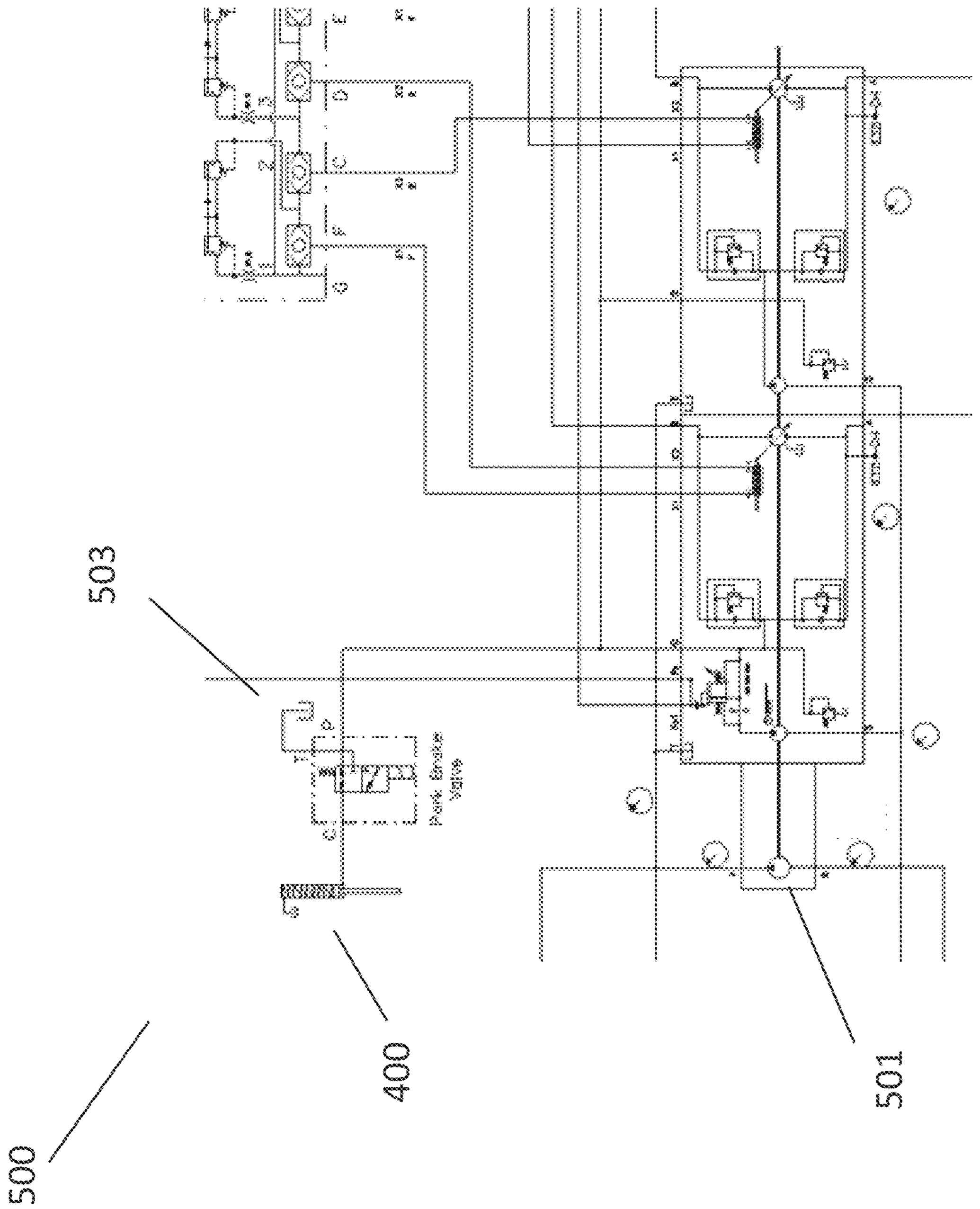
FIG. 10 is a diagrammatic view of the hydraulic circuit.

Finally, referring to FIG. 10, there is shown a diagrammatic view of the hydraulic circuit, indicated by the reference numeral 500. The hydraulic circuit comprises a transmission circuit 501 which feeds a charge flow to the locking cylinder 400 via the park brake valve circuit 503. In other words, similar to the park brake, when the fluid from the transmission circuit 501 is cut off, the charge flow to the locking cylinder 400 is cut off and the locking cylinder assumes a locked configuration.

Various modifications could be made without departing from the scope of the invention. For example, it is envisaged that it may be advantageous to have a tilt sensor (one or more tilt switches, one or more accelerometers, or a 3 axis accelerometer for example) that would detect when the forklift was on a slope, and a control system that would automatically apply the locking pin if it detected that the forklift was on a slope. In other words, it may be possible to provide a safety feature that would automatically apply the locking pin if the machine detected a potentially dangerous operating condition. However, care would be necessary to ensure that this did not cause damage to the machine or a more serious safety issue.

It is envisaged that in addition to the locking pin actuator switch located on the control panel, that it may be advantageous to provide a locking pin actuator switch (as illustrated by reference numeral 132 in FIGS. 1 and 2) located outside the driver's station accessible when the truck mounted forklift is mounted on the rear of a carrying vehicle. In this way, if the locking pin is engaged in the locking pin receiver with the rear wheel located in the incorrect position, the locking pin can be temporarily released to allow the wheel to be realigned without the driver having to climb up into the vehicle.

Throughout the specification, reference is made to a hydraulically operated locking pin. It is envisaged that an electrically operated locking pin may be provided instead of a hydraulically operated locking pin. For example, an electric motor or a solenoid may be provided to withdraw the locking pin from the locking pin receiver. This may be particularly advantageous on a battery powered truck mounted forklift. Alternatively, it is envisaged that a pneumatically operated locking pin may be provided instead of a hydraulically operated locking pin.

In this specification the terms "comprise, comprises, comprised and comprising" and the terms "include, includes, included and including" are all deemed interchangeable and should be afforded the widest possible interpretation.

The invention is not solely limited to the embodiments hereinbefore described but may be varied in both construction and detail within the scope of the appended claims.

What is claimed is:

1. A truck mounted forklift comprising a U-shaped chassis having a pair of forwardly projecting side bars bridged by a rear crossbar, a driver's station mounted on the chassis, a motive power unit mounted on the chassis, and a lifting mechanism mounted on the chassis for engagement of a load between the side bars, and in which there is provided a skid steer drive mechanism comprising a pair of driven front wheels, one driven front wheel mounted adjacent the forwardmost end of one of the side bars and the other driven front wheel mounted adjacent the forwardmost end of the other of the side bars, and a dolly rear wheel mounted on the rear crossbar, the dolly rear wheel being rotatably mounted about a vertical axis offset from a central axis of the dolly rear wheel, and in which there is provided a releasable locking mechanism to releasably secure the dolly rear wheel in a fixed orientation about the vertical axis, the releasable locking mechanism comprising a hydraulically operated locking pin mounted on the chassis and a complementary locking pin receiver mounted on the dolly rear wheel; and in which the hydraulically operated locking pin is provided with a charge feed to unlock the locking pin, the charge feed is fed from a transmission pump of the truck mounted forklift.

2. The truck mounted forklift as claimed in claim 1 in which there is provided a sensor on the hydraulically operated locking pin operable to detect when the locking pin is fully engaged in the locking pin receiver, and a locking pin indicator responsive to the sensor, the locking pin indicator being located in the driver's station operable to display whether the locking pin is in either a locked configuration engaging the locking pin receiver or a released configuration free of the locking pin receiver.

3. The truck mounted forklift as claimed in claim 1 in which there is provided a driver console in the driver's station, forward of a driver's seat, and in which there is provided a locking pin actuator switch on the driver console.

4. The truck mounted forklift as claimed in claim 3 in which the locking pin indicator is located on the driver console in the driver's station adjacent to the locking pin actuator switch.

5. The truck mounted forklift as claimed in claim 1 in which there is provided a locking pin actuator switch located outside the driver's station accessible when the truck mounted forklift is mounted on the rear of a carrying vehicle.

6. The truck mounted forklift as claimed in claim 1 in which the locking pin is spring loaded biased towards a locked configuration.

7. The truck mounted forklift as claimed in claim 1 in which the locking pin is chamfered to facilitate insertion of the end of the locking pin into the complementary locking pin receiver.

8. The truck mounted forklift as claimed in claim 1 in which the locking pin receiver comprises a locking plate held in a fixed relationship relative to the dolly rear wheel, the locking plate having a pair of locking pin receiving apertures.

9. The truck mounted forklift as claimed in claim 8 in which the pair of locking pin receiving apertures are located diametrically opposed to each other on the locking plate.

10. The truck mounted forklift as claimed in claim 8 in which the locking pin receiving apertures are located on the locking plate to cause the dolly wheel to be aligned parallel to a longitudinal axis of the truck mounted forklift when the locking pin is engaged in either of the locking pin receiving apertures.

11. The truck mounted forklift as claimed in claim 10 in which the central axis of the dolly rear wheel is forward of the vertical axis when the locking pin is engaged in the first locking pin receiving aperture, and the central axis of the dolly rear wheel is rearward of the vertical axis when the locking pin is engaged in the second locking pin receiving aperture.

12. The truck mounted forklift as claimed in claim 11 in which when the locking pin is engaged in the first locking pin receiving aperture, the dolly rear wheel is stowed under the truck mounted forklift substantially forward of the aft-most point of the truck mounted forklift.

13. The truck mounted forklift as claimed in claim 8 in which the locking plate is configured to promote location of the locking pin in the nearest locking pin receiving aperture when the locking pin is operated and abutting the locking plate.

14. The truck mounted forklift as claimed in claim 13 in which the upper surface of the locking plate surrounding the locking pin receiving aperture is inclined downwardly towards the locking pin receiving aperture.

15. The truck mounted forklift as claimed in claim 13 in which the locking pin tapers towards a tip, and there is provided a channel recessed in the upper surface of the locking plate for receiving the tip of the locking pin, the channel configured so that it widens as it approaches the locking pin receiving aperture.

16. A truck mounted forklift comprising a U-shaped chassis having a pair of forwardly projecting side bars bridged by a rear crossbar, a driver's station mounted on the chassis, a motive power unit mounted on the chassis, and a lifting mechanism mounted on the chassis for engagement of a load between the side bars, and in which there is provided a skid steer drive mechanism comprising a pair of driven front wheels, one driven front wheel mounted adjacent the forwardmost end of one of the side bars and the other driven front wheel mounted adjacent the forwardmost end of the other of the side bars, and a dolly rear wheel mounted on the rear crossbar, the dolly rear wheel being rotatably mounted about a vertical axis offset from a central axis of the dolly rear wheel, and in which there is provided a releasable locking mechanism to releasably secure the dolly rear wheel in a fixed orientation about the vertical axis, the releasable locking mechanism comprising a hydraulically operated locking pin mounted on the chassis and a complementary locking pin receiver mounted on the dolly rear wheel; and in which there is provided a sensor on the hydraulically operated locking pin operable to detect when the locking pin is fully engaged in the locking pin receiver, and a locking pin indicator responsive to the sensor, the locking pin indicator being located in the driver's station operable to display whether the locking pin is in either a locked configuration engaging the locking pin receiver or a released configuration free of the locking pin receiver.

17. The truck mounted forklift as claimed in claim 16 in which there is provided a driver console in the driver's station, forward of a driver's seat, and in which there is provided a locking pin actuator switch on the driver console.

18. A truck mounted forklift comprising a U-shaped chassis having a pair of forwardly projecting side bars bridged by a rear crossbar, a driver's station mounted on the chassis, a motive power unit mounted on the chassis, and a lifting mechanism mounted on the chassis for engagement of a load between the side bars, and in which there is provided a skid steer drive mechanism comprising a pair of driven front wheels, one driven front wheel mounted adjacent the forwardmost end of one of the side bars and the other driven front wheel mounted adjacent the forwardmost end of the other of the side bars, and a dolly rear wheel mounted on the rear crossbar, the dolly rear wheel being rotatably mounted about a vertical axis offset from a central axis of the dolly rear wheel, and in which there is provided a releasable locking mechanism to releasably secure the dolly rear wheel in a fixed orientation about the vertical axis, the releasable locking mechanism comprising a hydraulically operated locking pin mounted on the chassis and a complementary locking pin receiver mounted on the dolly rear wheel; and in which the complementary locking pin receiver comprises a locking plate held in a fixed relationship relative to the dolly rear wheel, the locking plate defining a pair of locking pin receiving apertures; the locking pin receiving apertures being located on the locking plate to cause the dolly wheel to be aligned parallel to a longitudinal axis of the truck mounted forklift when the locking pin is engaged in either of the locking pin receiving apertures; and in which the central axis of the dolly rear wheel is forward of the vertical axis when the locking pin is engaged in the first locking pin receiving aperture, and the central axis of the dolly rear wheel is rearward of the vertical axis when the locking pin is engaged in the second locking pin receiving aperture; and in which when the locking pin is engaged in the first locking pin receiving aperture, the dolly rear wheel is stowed under the truck mounted forklift substantially forward of the aft-most point of the truck mounted forklift.

19. A truck mounted forklift comprising a U-shaped chassis having a pair of forwardly projecting side bars bridged by a rear crossbar, a driver's station mounted on the chassis, a motive power unit mounted on the chassis, and a lifting mechanism mounted on the chassis for engagement of a load between the side bars, and in which there is provided a skid steer drive mechanism comprising a pair of driven front wheels, one driven front wheel mounted adjacent the forwardmost end of one of the side bars and the other driven front wheel mounted adjacent the forwardmost end of the other of the side bars, and a dolly rear wheel mounted on the rear crossbar, the dolly rear wheel being rotatably mounted about a vertical axis offset from a central axis of the dolly rear wheel, and in which there is provided a releasable locking mechanism to releasably secure the dolly rear wheel in a fixed orientation about the vertical axis, the releasable locking mechanism comprising a hydraulically operated locking pin mounted on the chassis and a complementary locking pin receiver mounted on the dolly rear wheel, and in which there is provided a driver console in the driver's station, forward of a driver's seat, and in which there is provided a locking pin actuator switch on the driver console.

* * * * *